United States Patent
Zuili et al.

(10) Patent No.: US 7,562,232 B2
(45) Date of Patent: Jul. 14, 2009

(54) SYSTEM AND METHOD FOR PROVIDING MANAGEABILITY TO SECURITY INFORMATION FOR SECURED ITEMS

(76) Inventors: Patrick Zuili, 696 Towle Way, Apt. 39, Palo Alto, CA (US) 94306; Klimenty Vainstein, 14840 Olive Ave., Apt. B, Morgan Hill, CA (US) 95037-9518

( * ) Notice: Subject to any disclaimer, the term of this patent is extended or adjusted under 35 U.S.C. 154(b) by 556 days.

(21) Appl. No.: 10/206,486

(22) Filed: Jul. 25, 2002

(65) Prior Publication Data

US 2003/0120684 A1    Jun. 26, 2003

Related U.S. Application Data

(63) Continuation of application No. 10/132,712, filed on Apr. 26, 2002, now abandoned, which is a continuation-in-part of application No. 10/075,194, filed on Feb. 12, 2002.

(60) Provisional application No. 60/339,634, filed on Dec. 12, 2001.

(51) Int. Cl.
| | |
|---|---|
| G06F 11/30 | (2006.01) |
| G06F 12/14 | (2006.01) |
| G06F 7/04 | (2006.01) |
| G06F 17/30 | (2006.01) |
| H04L 9/32 | (2006.01) |
| G06K 9/00 | (2006.01) |
| G11C 7/00 | (2006.01) |
| G06F 11/00 | (2006.01) |
| G06F 12/16 | (2006.01) |
| G06F 15/18 | (2006.01) |

(52) U.S. Cl. .................. 713/194; 726/2; 726/4; 726/6; 726/21; 726/26; 713/193

(58) Field of Classification Search ............ 726/2, 726/4, 26

See application file for complete search history.

(56) References Cited

U.S. PATENT DOCUMENTS 4,203,166 A    5/1980    Eshram et al.

(Continued)

FOREIGN PATENT DOCUMENTS

EP    0 672 991 A2    9/1995

(Continued)

OTHER PUBLICATIONS

"Inside Encrypting File System," Part 1, from MSDN Oct. 2001 version, exact publication date is unknown but believed prior to Dec. 12, 2001.

(Continued)

Primary Examiner—Ayaz R Sheikh
Assistant Examiner—Shin-Hon Chen
(74) Attorney, Agent, or Firm—Sterne, Kessler, Goldstein & Fox P.L.L.C.

(57) ABSTRACT

Improved approaches for accessing secured digital assets (e.g., secured items) are disclosed. In general, digital assets that have been secured (secured digital assets) can only be accessed by authenticated users with appropriate access rights or privileges. Each secured digital asset is provided with a header portion and a data portion, where the header portion includes a pointer to separately stored security information. The separately stored security information is used to determine whether access to associated data portions of secured digital assets is permitted. These improved approaches can facilitate the sharing of security information by various secured digital assets and thus reduce the overall storage space for the secured digital assets. These improved approaches can also facilitate efficient management of security for digital assets.

32 Claims, 11 Drawing Sheets

U.S. PATENT DOCUMENTS

| | | |
|---|---|---|
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |
| 5,414,852 A | 5/1995 | Kramer et al. |
| 5,495,533 A | 2/1996 | Linehan et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,655,119 A | 8/1997 | Davy |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,684,987 A | 11/1997 | Mamiya et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A * | 2/1998 | Stefik .......................... 705/44 |
| 5,717,755 A | 2/1998 | Shanton |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,778,065 A | 7/1998 | Hauser et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson |
| 5,835,592 A | 11/1998 | Chang et al. |
| 5,835,601 A | 11/1998 | Shimbo et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schneck et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,987,440 A | 11/1999 | O'Neil et al. |
| 5,991,879 A | 11/1999 | Still |
| 5,999,907 A | 12/1999 | Donner |
| 6,014,730 A | 1/2000 | Ohtsu |
| 6,023,506 A | 2/2000 | Ote et al. |
| 6,032,216 A * | 2/2000 | Schmuck et al. ............ 710/200 |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,957 A | 5/2000 | Richards |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 9/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,158,010 A | 12/2000 | Moriconi et al. |
| 6,161,139 A | 12/2000 | Win et al. |
| 6,182,142 B1 | 1/2001 | Win et al. |
| 6,185,684 B1 | 2/2001 | Pravetz et al. |
| 6,192,408 B1 | 2/2001 | Vahalia et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,272,631 B1 | 8/2001 | Thomlinson et al. |
| 6,272,632 B1 | 8/2001 | Carmen et al. |
| 6,282,649 B1 | 8/2001 | Lambert et al. |
| 6,289,450 B1 | 9/2001 | Pensak et al. |
| 6,292,895 B1 | 9/2001 | Baltzley |
| 6,292,899 B1 | 9/2001 | McBride |
| 6,295,361 B1 | 9/2001 | Kadansky et al. |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,409 B2 | 11/2001 | Schneck et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |

| Patent | Date | Inventor |
|---|---|---|
| 6,370,249 B1 | 4/2002 | Van Oorschot |
| 6,381,698 B1 | 4/2002 | Devanbu et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,107,269 B2 | 9/2006 | Arlein et al. |
| 7,107,416 B2 | 9/2006 | Stuart et al. |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |

| | | | | | | |
|---|---|---|---|---|---|---|
| 7,203,317 B2 | 4/2007 | Kallahalla et al. | | 2003/0023559 A1 | 1/2003 | Choi et al. |
| 7,203,968 B2 | 4/2007 | Asano et al. | | 2003/0028610 A1 | 2/2003 | Pearson |
| 7,219,230 B2 | 5/2007 | Riedel et al. | | 2003/0033528 A1 | 2/2003 | Ozog et al. |
| 7,224,795 B2 | 5/2007 | Takada et al. | | 2003/0037133 A1 | 2/2003 | Owens |
| 7,225,256 B2 | 5/2007 | Villavicencio | | 2003/0037237 A1 | 2/2003 | Abgrall et al. |
| 7,227,953 B2 | 6/2007 | Shida | | 2003/0037253 A1 | 2/2003 | Blank et al. |
| 7,233,948 B1 | 6/2007 | Shamoon et al. | | 2003/0046238 A1 | 3/2003 | Nonaka et al. |
| 7,237,002 B1 | 6/2007 | Estrada et al. | | 2003/0050919 A1* | 3/2003 | Brown et al. ................ 707/2 |
| 7,249,044 B2 | 7/2007 | Kumar et al. | | 2003/0051039 A1 | 3/2003 | Brown et al. |
| 7,260,555 B2 | 8/2007 | Rossmann et al. | | 2003/0056139 A1 | 3/2003 | Murray et al. |
| 7,265,764 B2 | 9/2007 | Alben et al. | | 2003/0074580 A1 | 4/2003 | Knouse et al. |
| 7,266,684 B2 | 9/2007 | Jancula | | 2003/0078959 A1 | 4/2003 | Yeung et al. |
| 7,280,658 B2 | 10/2007 | Amini et al. | | 2003/0079175 A1 | 4/2003 | Limantsev |
| 7,287,055 B2 | 10/2007 | Smith et al. | | 2003/0081784 A1 | 5/2003 | Kallahalla et al. |
| 7,290,148 B2 | 10/2007 | Tozawa et al. | | 2003/0081787 A1 | 5/2003 | Kallahalla et al. |
| 7,308,702 B1 | 12/2007 | Thomsen et al. | | 2003/0088517 A1 | 5/2003 | Medoff |
| 7,313,824 B1 | 12/2007 | Bala et al. | | 2003/0088783 A1 | 5/2003 | DiPierro |
| 7,319,752 B2 | 1/2008 | Asano et al. | | 2003/0101072 A1 | 5/2003 | Dick et al. |
| 7,340,600 B1 | 3/2008 | Corella | | 2003/0110169 A1 | 6/2003 | Zuili |
| 7,380,120 B1 | 5/2008 | Garcia | | 2003/0110266 A1 | 6/2003 | Rollins et al. |
| 7,383,586 B2 | 6/2008 | Cross et al. | | 2003/0110397 A1 | 6/2003 | Supramaniam |
| 7,386,529 B2 | 6/2008 | Kiessig et al. | | 2003/0115146 A1 | 6/2003 | Lee et al. |
| 2001/0011254 A1 | 8/2001 | Clark | | 2003/0115218 A1 | 6/2003 | Bobbitt et al. |
| 2001/0021255 A1 | 9/2001 | Ishibashi | | 2003/0115570 A1 | 6/2003 | Bisceglia |
| 2001/0021926 A1 | 9/2001 | Schneck et al. | | 2003/0120601 A1 | 6/2003 | Ouye |
| 2001/0023421 A1 | 9/2001 | Numao et al. | | 2003/0120684 A1 | 6/2003 | Zuili et al. |
| 2001/0032181 A1 | 10/2001 | Jakstadt et al. | | 2003/0126434 A1 | 7/2003 | Lim et al. |
| 2001/0034839 A1 | 10/2001 | Karjoth et al. | | 2003/0154381 A1 | 8/2003 | Ouye |
| 2001/0044903 A1 | 11/2001 | Yamamoto et al. | | 2003/0159066 A1 | 8/2003 | Staw et al. |
| 2001/0056550 A1 | 12/2001 | Lee | | 2003/0172280 A1 | 9/2003 | Scheidt et al. |
| 2002/0010679 A1 | 1/2002 | Felsher | | 2003/0177070 A1 | 9/2003 | Viswanath et al. |
| 2002/0013772 A1 | 1/2002 | Peinado | | 2003/0177378 A1 | 9/2003 | Wittkotter |
| 2002/0016921 A1* | 2/2002 | Olsen et al. ................ 713/200 | | 2003/0182579 A1 | 9/2003 | Leporini et al. |
| 2002/0016922 A1* | 2/2002 | Richards et al. ............ 713/200 | | 2003/0196096 A1 | 10/2003 | Sutton |
| 2002/0023208 A1 | 2/2002 | Jancula | | 2003/0197729 A1 | 10/2003 | Denoue et al. |
| 2002/0029340 A1 | 3/2002 | Pensak et al. | | 2003/0200202 A1 | 10/2003 | Hsiao et al. |
| 2002/0031230 A1 | 3/2002 | Sweet et al. | | 2003/0217264 A1 | 11/2003 | Martin et al. |
| 2002/0035624 A1 | 3/2002 | Kim | | 2003/0217333 A1 | 11/2003 | Smith et al. |
| 2002/0042756 A1 | 4/2002 | Kumar et al. | | 2003/0226013 A1 | 12/2003 | Dutertre |
| 2002/0046350 A1 | 4/2002 | Lordemann et al. | | 2003/0233650 A1 | 12/2003 | Zaner et al. |
| 2002/0050098 A1 | 5/2002 | Chan | | 2004/0022390 A1 | 2/2004 | McDonald et al. |
| 2002/0056042 A1 | 5/2002 | Van Der Kaay et al. | | 2004/0025037 A1 | 2/2004 | Hair |
| 2002/0062240 A1 | 5/2002 | Morinville | | 2004/0039781 A1 | 2/2004 | LaVallee et al. |
| 2002/0062245 A1 | 5/2002 | Niu et al. | | 2004/0064710 A1 | 4/2004 | Vainstein |
| 2002/0069077 A1 | 6/2002 | Brophy et al. | | 2004/0068524 A1 | 4/2004 | Aboulhosn et al. |
| 2002/0069272 A1 | 6/2002 | Kim et al. | | 2004/0068664 A1 | 4/2004 | Nachenberg et al. |
| 2002/0069363 A1 | 6/2002 | Winburn | | 2004/0073660 A1 | 4/2004 | Toomey |
| 2002/0073320 A1 | 6/2002 | Rinkevich et al. | | 2004/0073718 A1 | 4/2004 | Johannessen et al. |
| 2002/0077986 A1 | 6/2002 | Kobata et al. | | 2004/0088548 A1 | 5/2004 | Smetters et al. |
| 2002/0077988 A1 | 6/2002 | Sasaki et al. | | 2004/0098580 A1 | 5/2004 | DeTreville |
| 2002/0078361 A1 | 6/2002 | Giroux et al. | | 2004/0103202 A1 | 5/2004 | Hildebrand et al. |
| 2002/0087479 A1 | 7/2002 | Malcolm | | 2004/0103280 A1 | 5/2004 | Balfanz et al. |
| 2002/0091745 A1 | 7/2002 | Ramamurthy et al. | | 2004/0133544 A1 | 7/2004 | Kiessig et al. |
| 2002/0099947 A1 | 7/2002 | Evans | | 2004/0158586 A1 | 8/2004 | Tsai |
| 2002/0124180 A1 | 9/2002 | Hagman | | 2004/0193602 A1 | 9/2004 | Liu et al. |
| 2002/0129235 A1 | 9/2002 | Okamoto et al. | | 2004/0193905 A1 | 9/2004 | Lirov et al. |
| 2002/0133699 A1 | 9/2002 | Pueschel | | 2004/0193912 A1 | 9/2004 | Li et al. |
| 2002/0138762 A1 | 9/2002 | Horne | | 2004/0199514 A1 | 10/2004 | Rosenblatt et al. |
| 2002/0143710 A1 | 10/2002 | Liu | | 2004/0215956 A1 | 10/2004 | Venkatachary et al. |
| 2002/0143906 A1 | 10/2002 | Tormasov et al. | | 2004/0215962 A1 | 10/2004 | Douceur et al. |
| 2002/0156726 A1 | 10/2002 | Kleckner et al. | | 2004/0243853 A1 | 12/2004 | Swander et al. |
| 2002/0157016 A1 | 10/2002 | Russell et al. | | 2005/0021467 A1 | 1/2005 | Franzdonk |
| 2002/0162104 A1 | 10/2002 | Raike et al. | | 2005/0021629 A1 | 1/2005 | Cannata et al. |
| 2002/0169963 A1 | 11/2002 | Seder et al. | | 2005/0028006 A1 | 2/2005 | Leser et al. |
| 2002/0169965 A1 | 11/2002 | Hale et al. | | 2005/0039034 A1 | 2/2005 | Doyle et al. |
| 2002/0172367 A1 | 11/2002 | Mulder et al. | | 2005/0071275 A1 | 3/2005 | Vainstein et al. |
| 2002/0174109 A1 | 11/2002 | Chandy et al. | | 2005/0071657 A1 | 3/2005 | Ryan |
| 2002/0176572 A1 | 11/2002 | Ananth | | 2005/0071658 A1 | 3/2005 | Nath et al. |
| 2002/0178271 A1 | 11/2002 | Graham et al. | | 2005/0081029 A1 | 4/2005 | Thornton et al. |
| 2002/0194484 A1 | 12/2002 | Bolosky et al. | | 2005/0086531 A1 | 4/2005 | Kenrich |
| 2002/0198798 A1 | 12/2002 | Ludwig et al. | | 2005/0091484 A1 | 4/2005 | Thornton et al. |
| 2003/0009685 A1 | 1/2003 | Choo et al. | | 2005/0120199 A1 | 6/2005 | Carter |
| 2003/0014391 A1 | 1/2003 | Evans et al. | | 2005/0138371 A1 | 6/2005 | Supramaniam |

| | | | |
|---|---|---|---|
| 2005/0138383 A1 | 6/2005 | Vainstein | |
| 2005/0177716 A1 | 8/2005 | Ginter et al. | |
| 2005/0177858 A1 | 8/2005 | Ueda | |
| 2005/0198326 A1 | 9/2005 | Schlimmer et al. | |
| 2005/0223242 A1 | 10/2005 | Nath | |
| 2005/0223414 A1 | 10/2005 | Kenrich et al. | |
| 2005/0235154 A1 | 10/2005 | Serret-Avila | |
| 2005/0256909 A1 | 11/2005 | Aboulhosn et al. | |
| 2005/0273600 A1 | 12/2005 | Seeman | |
| 2005/0283610 A1 | 12/2005 | Serret-Avila et al. | |
| 2005/0288961 A1 | 12/2005 | Tabrizi | |
| 2006/0005021 A1 | 1/2006 | Torrubia-Saez | |
| 2006/0075465 A1 | 4/2006 | Ramanathan et al. | |
| 2006/0093150 A1 | 5/2006 | Reddy et al. | |
| 2006/0168147 A1 | 7/2006 | Inoue et al. | |
| 2006/0230437 A1 | 10/2006 | Boyer et al. | |
| 2007/0006214 A1 | 1/2007 | Dubal et al. | |
| 2007/0067837 A1 | 3/2007 | Schuster | |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 | 9/2000 |
| WO | WO 01/61438 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

"Inside Encrypting File System," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS Works," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS," from MSDN Oct. 2001 version, exact publication date is unknown but believed prior to Dec. 12, 2001.

"Windows 2000 EFS," in the April 1999 issue of Windows NT Magazine.

"Expiration Mechanism for Chipcards," IBM Technical Disclosure Bulletin, Oct. 1, 2001, UK.

McDaniel et al., "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

Microsoft Windows 2000 Server. Windows 2000 Group Policy White Paper, 2000.

Symantec. Norton Antivirus Corporate Edition Implementation Guide, 1999.

"Affect," The American Heritage Dictionary of the English Language, Fourth Edition, Houghton Mifflin Company, 2002. Retrieved May 4, 2006 from http://dictionary.reference.com/search?q=affect.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/028,397, entitled "Method and system for restricting use of a clipboard application," inventor Zuili, Dec. 21, 2001. 38 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities" inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files" inventor Ryan, Jun. 30, 2003, 33 pgs.

U.S. Appl. No. 10/448,806, entitled "Method and System for Using Remote Headers to Secure Electronic Files" inventor Ryan, May 30, 2003, 35 pgs.

U.S. Appl. No. 10/074,194, entitled "Methods for idnetifying compounds that inhibit or reduce PTPIB expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/186,203, entitled "Method and System for Implementing Changes to Security Policies in a Distributed Security System," inventor Huang, Jun. 26, 2002, 65 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Method and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Office Action, dated May 10, 2005, for European Patent Application No. 02258532.7, 5 pgs.

Office Action, dated Dec. 5, 2006, for European Patent Application No. 02258532.7, 5 pgs.

Boneh et al., "Hierarchical Identity Based Encryption with Constant Size Ciphertext," Advances in Cryptology-Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

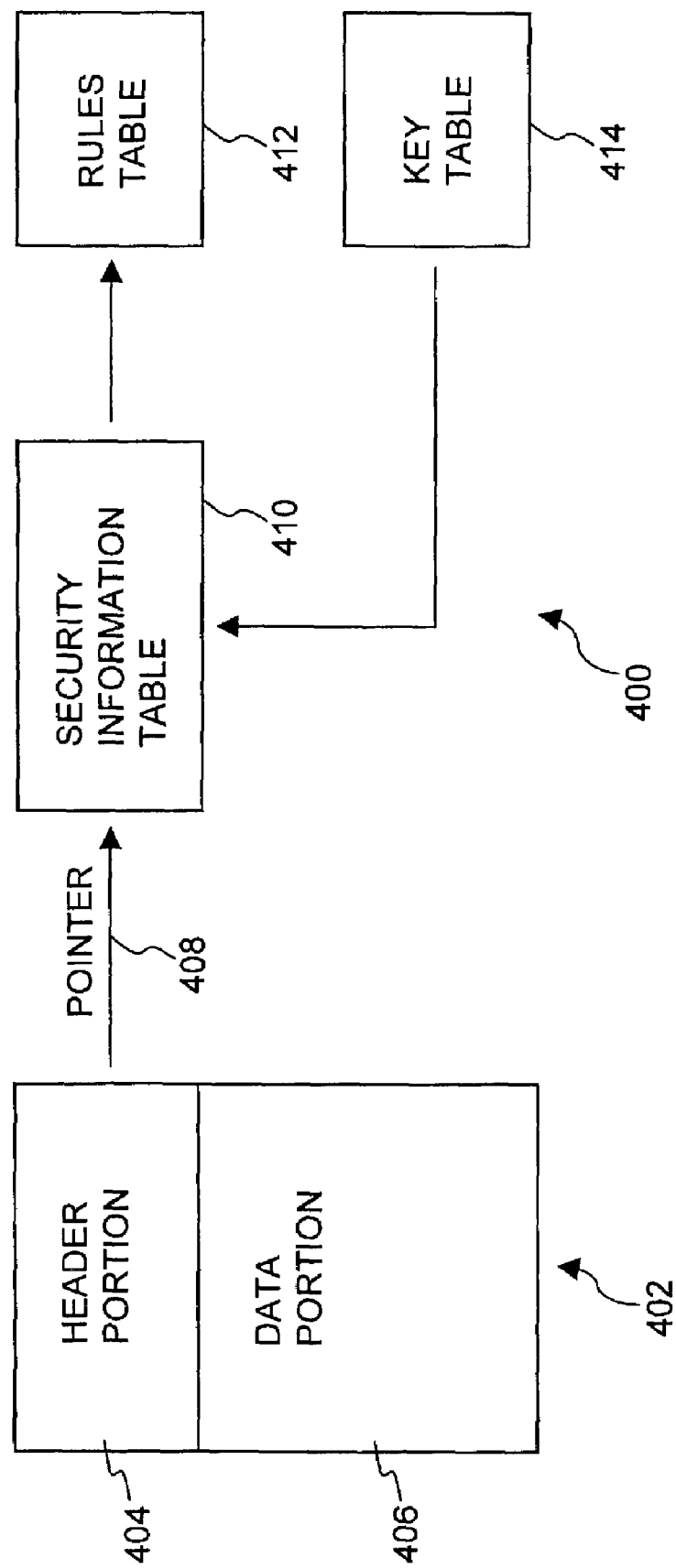

SYSTEM AND METHOD FOR PROVIDING MANAGEABILITY TO SECURITY INFORMATION FOR SECURED ITEMS

CROSS-REFERENCE TO RELATED APPLICATIONS

This application is a continuation application of U.S. patent application Ser. No. 10/132,712, filed Apr. 26, 2002, and entitled "SYSTEM AND METHOD FOR PROVIDING MANAGEABILITY TO SECURITY INFORMATION FOR SECURED ITEMS," (now abandoned) which is a continuation-in-part application of U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," and which claims the benefit of U.S. Provisional Application No. 60/339,634 filed Dec. 12, 2001, and entitled "PERVASIVE SECURITY SYSTEM," all of which are hereby incorporated by reference for all purposes.

BACKGROUND OF THE INVENTION

1. Field of the Invention

The present invention relates to security systems for data and, more particularly, to security systems that protect data in an enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remains available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Therefore, there is a need to provide more effective ways to secure and protect resources on private networks.

SUMMARY OF THE INVENTION

The invention relates to improved approaches for accessing secured digital assets (e.g., secured items). In general, digital assets that have been secured (secured digital assets) can only be accessed by authenticated users with appropriate access rights or privileges. Each secured digital asset is provided with a header portion and a data portion, where the header portion includes a pointer to separately stored security information. The separately stored security information is used to determine whether access to associated data portions of secured digital assets is permitted. These improved approaches can facilitate the sharing of security information by various secured digital assets and thus reduce the overall storage space for the secured digital assets. These improved approaches can also facilitate efficient management of security for the secured digital assets.

The invention can be implemented in numerous ways, including as a method, system, device, and computer readable medium. Several embodiments of the invention are discussed below.

As a method for accessing a secured file, one embodiment of the invention includes at least the acts of: obtaining the secured file to be accessed, the secured file having a header portion and a data portion; retrieving a security information pointer from the header portion of the secured file; obtaining security information for the secured file using the security information pointer; and permitting access to the secured file to the extent permitted by the security information.

As a computer readable medium including at least computer program code for accessing a secured item, one embodiment of the invention includes at least: computer program code for obtaining the secured item to be accessed, the secured item having a header portion and a data portion; computer program code for retrieving a security information pointer from the header portion of the secured item; computer program code for obtaining security information for the secured item using the security information pointer; and computer program code for permitting access to the secured item to the extent permitted by the security information.

As a system for accessing a secured item, where the secured item has a header portion and an encrypted data portion, and where the header portion includes at least a pointer and an encrypted key, one embodiment of the invention includes at least: a storage device that stores security information for a plurality of different secured items, the pointer serving to locate the security information associated with secured item; a first decryption module that receives the encrypted key from the header portion of the secured item and decrypts the encrypted key to obtain a key; an access analyzer that determines whether the encrypted data portion is permitted to be accessed by a requestor based on the security information; and a second decryption module that decrypts the encrypted data portion using the key to produce an unencrypted data portion that the requestor is able to access, provided the access analyzer determines that the encrypted data portion is permitted to be accessed by a requestor.

As a data structure for a secured file, one embodiment of the invention includes at least a header portion and a data portion. The header portion contains at least a pointer to separately stored security information and a key. At least the key portion of the header portion is encrypted. The data portion contains at least encrypted data of the secured file.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings wherein:

FIG. 4A illustrates a data organization item according to one embodiment of the invention.

DETAILED DESCRIPTION OF THE INVENTION

The present invention relates to improved approaches for accessing secured digital assets (e.g., secured items). In general, digital assets that have been secured (secured digital assets) can only be accessed by authenticated users with appropriate access rights or privileges. Each secured digital asset is provided with a header portion and a data portion, where the header portion includes a pointer to separately stored security information. The separately stored security information is used to determine whether access to associated data portions of secured digital assets is permitted. These improved approaches can facilitate the sharing of security information by various secured digital assets and thus reduce the overall storage space for the secured digital assets. These improved approaches can also facilitate efficient management of security for the secured digital assets.

Digital assets may include, but not be limited to, various types of documents, multimedia files, data, executable code, images and text. In the context of the present invention, digital assets may also include directories/folders as well as any OS-addressable resources (e.g. a thread to a port, or a device). The present invention is particularly suitable in an inter/intra enterprise environment.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-6B. However, those skilled in the art will readily appreciate that the detailed description given herein with respect to these figures is for explanatory purposes as the invention extends beyond these limited embodiments.

Figure 1A:
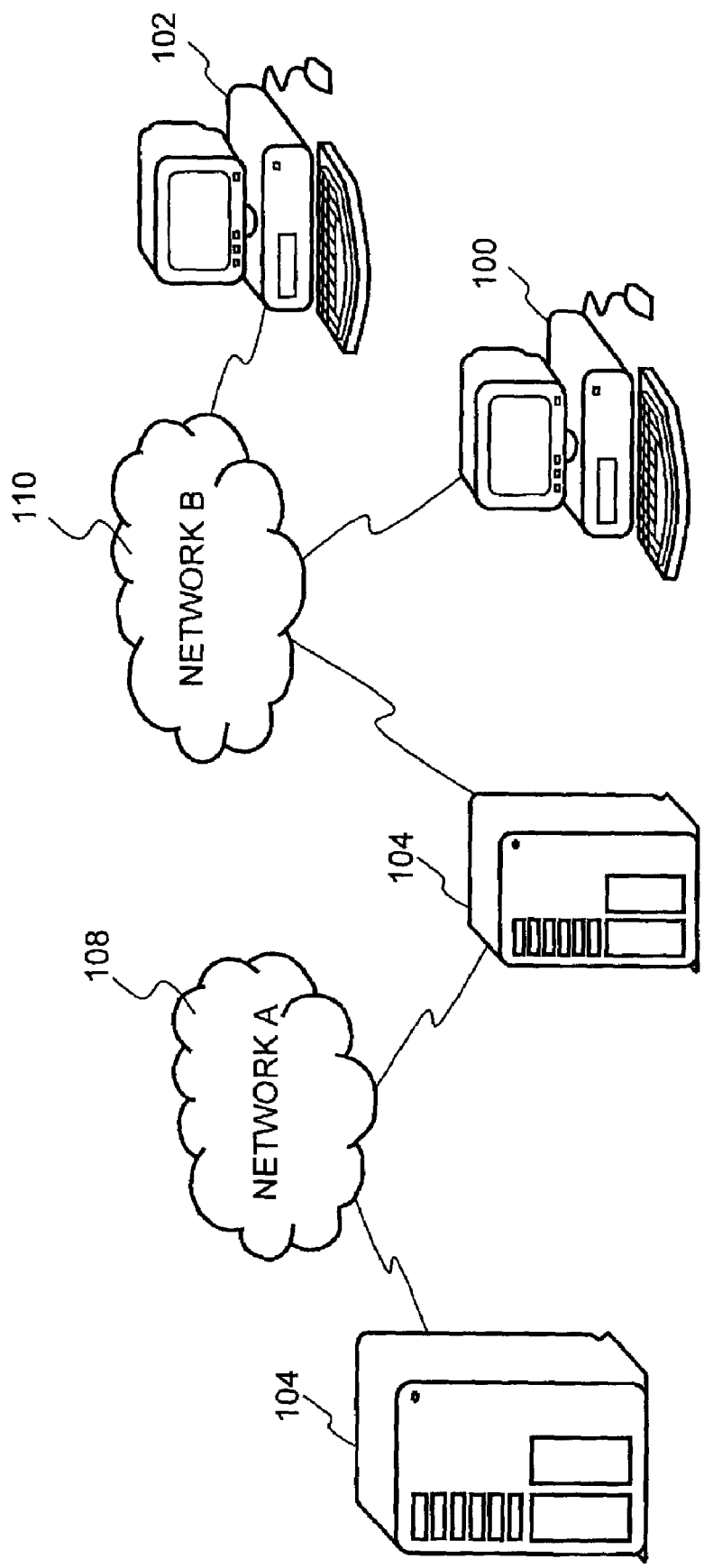
FIG. 1A shows a basic system configuration in which the invention may be practiced in accordance with an embodiment thereof.

FIG. 1A shows a basic system configuration in which the present invention may be practiced in accordance with one embodiment thereof. Documents or files may be created using an authoring tool executed on a client computer 100, which may be a desktop computing device, a laptop computer, or a mobile computing device. Exemplary authoring tools may include application programs such as Microsoft Office (e.g., Microsoft Word, Microsoft PowerPoint, and Microsoft Excel), Adobe FrameMaker and Adobe Photoshop.

According to one embodiment, the client computer 100 is loaded with a client module that is a linked and compiled, or interpreted, version of one embodiment of the present invention and is capable of communicating with a server 104 or 106 over a data network (e.g., the Internet or a local area network). According to another embodiment, the client computer 100 is coupled to the server 104 through a private link. As will be further explained below, a document or file created by an authoring tool can be secured by the client module. The client module, when executed, is configured to ensure that a secured document is secured at all times in a store (e.g., a hard disk or other data repository). The secured documents can only be accessed by users with proper access privileges. In general, an access privilege or access privileges for a user may include, but not be limited to, a viewing permit, a copying permit, a printing permit, an editing permit, a transferring permit, an uploading/downloading permit, and a location permit.

According to one embodiment, a created document is caused to go through an encryption process that is preferably transparent to a user. In other words, the created document is encrypted or decrypted under the authoring application so that the user is not aware of the process. A key (referred to herein as a user key) can be used to retrieve a file key to decrypt an encrypted document. Typically, the user key is associated with an access privilege for the user or a group of users. For a given secured document, only a user with a proper access privilege can access the secured document.

In one setting, a secured document may be uploaded via the network 110 from the computer 100 to a computing or storage device 102 that may serve as a central repository. Although not necessary, the network 110 can provide a private link between the computer 100 and the computing or storage device 102. Such link may be provided by an internal network in an enterprise or a secured communication protocol (e.g., VPN and HTTPS) over a public network (e.g., the Internet). Alternatively, such link may be simply provided by a TCP/IP link. As such, secured documents on the computer 100 may be remotely accessed.

In another setting, the computer 100 and the computing or storage device 102 are inseparable, in which case the computing or storage device 102 may be a local store to retain secured documents or receive secured network resources (e.g., dynamic Web contents, results of a database query, or a live multimedia feed). Regardless of where the secured documents or secured sources are actually located, a user, with proper access privilege, can access the secured documents or sources from the computer 100 or the computing or storage device 102 using an application (e.g., Internet Explorer, Microsoft Word or Acrobat Reader).

The server 104, also referred to as a local server, is a computing device coupled between a network 108 and the network 110. According to one embodiment, the server 104 executes a local version of a server module. The local version is a localized server module configured to service a group of designated users or client computers, or a location. Another server 106, also referred to as a central server, is a computing device coupled to the network 108. The server 106 executes the server module and provides centralized access control (AC) management for an entire organization or business. Accordingly, respective local modules in local servers, in coordination with the central server, form a distributed mechanism to provide distributed AC management. Such distributed access control management ensures the dependability, reliability and scalability of centralized AC management undertaken by the central server for an entire enterprise or a business location.

Figure 1B:
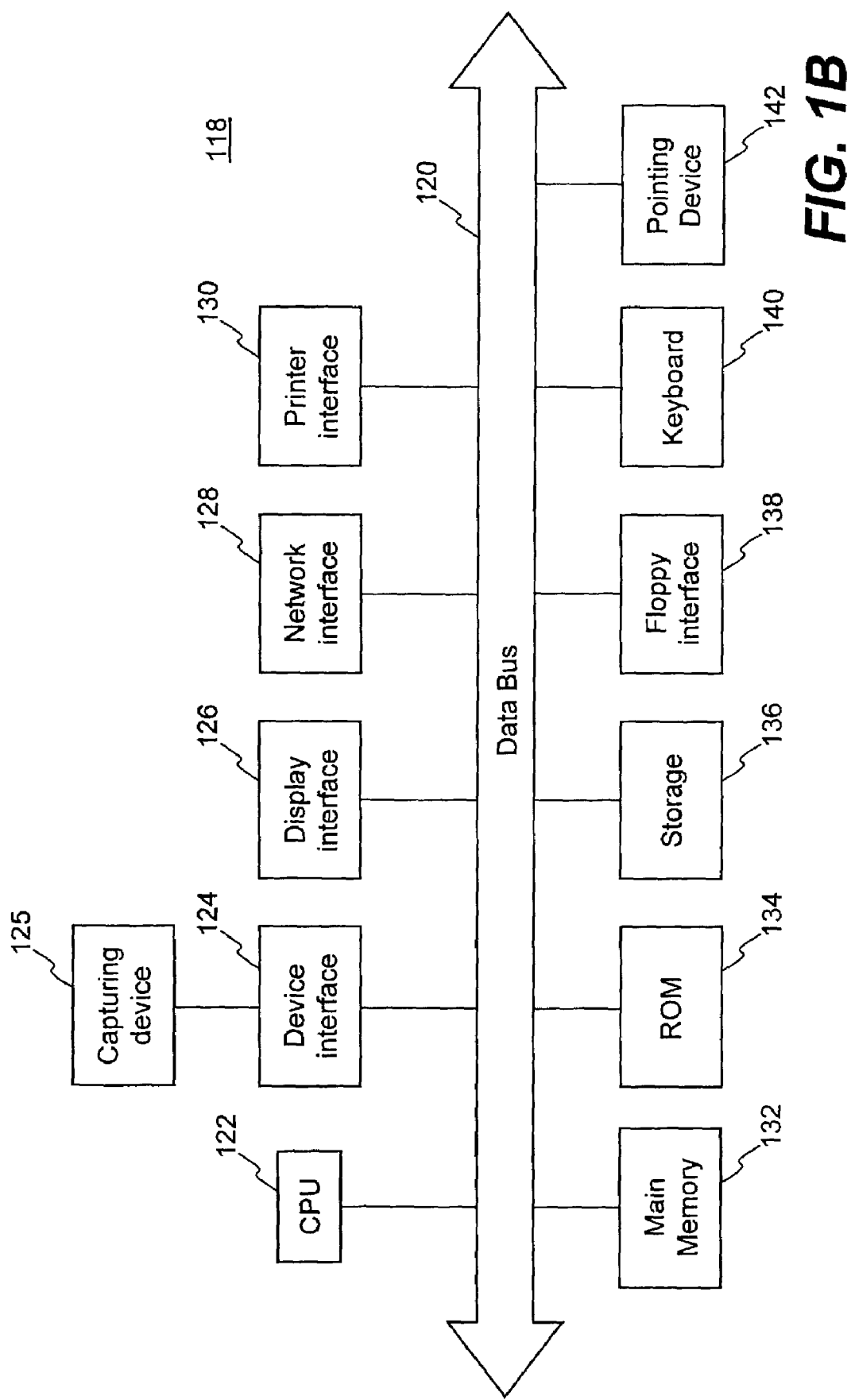
FIG. 1B shows internal construction blocks of a computing device in which the invention may be implemented and executed.

FIG. 1B shows internal construction blocks of a computing device 118 in which one embodiment of the present invention may be implemented and executed. The computing device 118 may correspond to a client device (e.g., computer 100, computing or storage device 102 in FIG. 1A) or a server device (e.g., server 104, 106 in FIG. 1A). As shown in FIG. 1B, the computing device 118 includes a central processing unit (CPU) 122 interfaced to a data bus 120 and a device interface 124. CPU 122 executes instructions to process data and perhaps manage all devices and interfaces coupled to data bus 120 for synchronized operations. The instructions being executed can, for example, pertain to drivers, operating system, utilities or applications. A device interface 124 may be coupled to an external device, such as the computing device 102 of FIG. 1A; hence, the secured documents therefrom can be received into memory 132 or storage 136 through data bus 120. Also interfaced to data bus 120 is a display interface 126, a network interface 128, a printer interface 130 and a floppy disk drive interface 138. Generally, a client module, a local module or a server module of an executable version of one embodiment of the present invention can be stored to storage 136 through floppy disk drive interface 138, network interface 128, device interface 124 or other interfaces coupled to data bus 120. Execution of such module by CPU 122 can cause the computing device 118 to perform as desired in the present invention. In one embodiment, the device interface 124 provides an interface for communicating with a capturing device 125 (e.g., a fingerprint sensor, a smart card reader or a voice recorder) to facilitate the authentication of a user of the computing device 118.

Main memory 132, such as random access memory (RAM), is also interfaced to data bus 120 to provide CPU 122 with instructions and access to memory storage 136 for data and other instructions. In particular, when executing stored application program instructions, such as for document securing or document accessing, CPU 122 is caused to manipulate the data to achieve results contemplated by the program instructions. Read-Only Memory (ROM) 134 is provided for storing executable instructions, such as a basic input/output operation system (BIOS) for operation of keyboard 140, display 126 and pointing device 142 that may be present.

In one embodiment, the computing or storage device 102 is capable of storing secured items (e.g., secured files) in the main memory 132 or the storage 136. The main memory 132 provides non-persistent (i.e., volatile) storage for the secured items and the storage 136 provides persistent (i.e., non-volatile) storage for the secured items. Hence, the computing or storage device 102, or more particularly, the main memory 132 and/or the storage 136, can act as a storage device for the secured items.

Figure 2A:
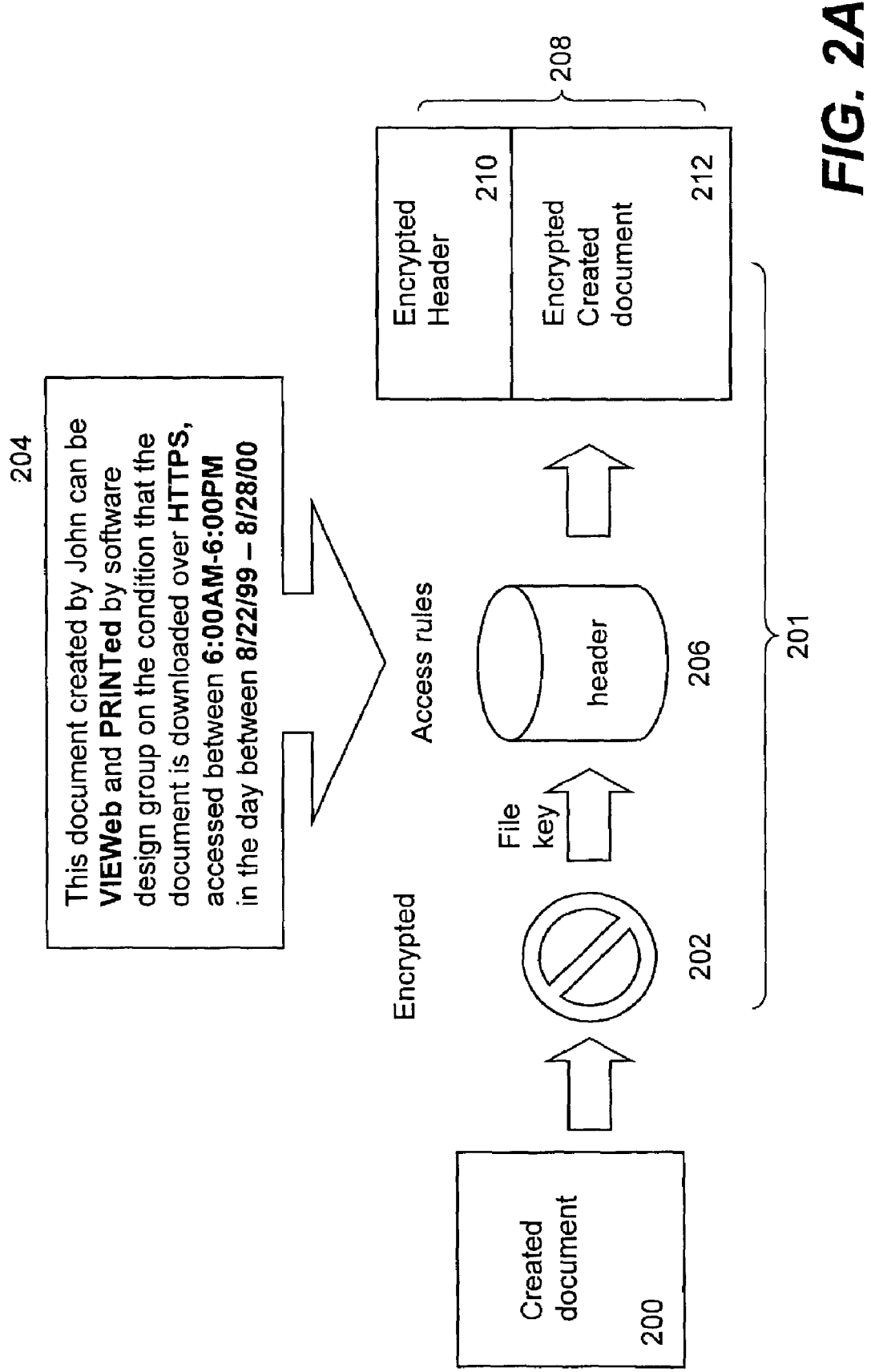
FIG. 2A is a block diagram of securing a created document.

Referring now to FIG. 2A, a block diagram of securing a created document 200 is shown according to one embodiment of the invention. After the document 200 is created with an application or authoring tool and upon an activation of a "Save," "Save As" or "Close" command or automatic saving invoked by an operating system, the application itself or another application, the created document 200 is caused to undergo a securing process 201. The securing process 201 starts with an encryption process 202, namely, the document 200 that has been created or is being written into a store is encrypted by a cipher with a file key. In other words, the encrypted document could not be opened without the file key (i.e., a cipher key).

A set of access rules 204 for the document 200 is received and associated with a header 206. In general, the access rules 204 determine or regulate who and/or how the document 200, once secured, can be accessed. In some cases, the access rules 204 also determine or regulate when or where the document 200 can be accessed. Typically, a header is a file structure, small in size and includes, or perhaps links to, security information about a resultant secured document. Depending on an exact implementation, the security information can be entirely included in a header or pointed to by a pointer that is included in the header. According to one embodiment, the access rules 204, as part of the security information, are included in the header 206. According to another embodiment, the access rules 204, as part of the security information, are separately stored from the document 200 but referenced by one or more pointers or links therein. According to still another embodiment, the pointers in the header 206 can point to different versions of security information providing different access control depending on user's access privilege. The security information or the header 206 further includes a file key. Some or all of the header 206 can then be encrypted by a cipher with a user key associated with an authorized user to an encrypted header 210. The encrypted header 210 is attached to the encrypted document 212 to generate a secured document 208.

It is understood that a cipher may be implemented based on one of many encryption/decryption schemes. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any encryption/decryption scheme that is effective and reliable may be used. Hence, the details of encryption/decryption schemes are not further discussed herein so as to avoid obscuring aspects of the present invention.

To access the secured document 208, one needs to obtain the file key that is used to encrypt the document. To obtain the file key, one needs to be authenticated to get a user or group key and pass an access test in which the access rules in the security information are measured against the user's access privilege.

It should be noted that the header in a secured document may be configured differently than noted above without departing from the principles of the present invention. For example, a secured document may include a header with a plurality of encrypted headers, each can be accessible only by one designated user or a group users. Alternatively, a header in a secured document may include more than one set of security information or pointers thereto, each set being for one designated user or a group of users while a single file key can be used by all. Some or all of the access rules may be viewed or updated by users who can access the secured document.

In general, the encryption process and its counter process, decryption, are implemented in a filter or a software module that is activated when a secured document or item is involved. According to one embodiment in an operating system, the software module can be configured to control access to some digital assets (e.g., a port or a device) that may not be encrypted. However, an access to a secured port or device can trigger the software module to operate to control access thereto.

As will be further described below, to access a secured document, a user needs a user key or keys to decrypt the encrypted security information or at least a portion of the header first. In one embodiment, the key or keys are associated with a user's login to a local server or a central server. Appropriate access privileges associated with the user are validated if the user has been authenticated or previously registered with the server and properly logged in. Depending on the permission or the access privileges, the access rules for the secured document determine whether the contents of the document shall be revealed to the user.

According to one embodiment, the access rules are present in a markup language, such as HTML, SGML and XML. In a preferred embodiment, the markup language is Extensible Access Control Markup Language (XACML) that is essentially an XML specification for expressing policies for information access. In general, XACML can address fine-grained control of authorized activities, the effect of characteristics of the access requestor, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

In general, a document is encrypted with a cipher (e.g., a symmetric or asymmetric encryption scheme). Encryption is the transformation of data into a form that is impossible to read without appropriate knowledge (e.g., a key). Its purpose is to ensure privacy by keeping information hidden from anyone to whom it is not intended, even those who have access to other encrypted data. Decryption is the reverse of encryption. Encryption and decryption generally require the use of some secret information, referred to as a key. For some encryption mechanisms, the same key is used for both encryption and decryption; for other mechanisms, the keys used for encryption and decryption are different.

For the purpose of controlling the access to the document, the key or keys, referred collectively to as a file key, may be the same or different keys for encryption and decryption and are preferably included in the security information contained in or pointed to by the header and, once obtained, can be used to decrypt the encrypted document. To ensure that the key is not to be retrieved or accessible by anyone, the key itself is guarded by the access rules. If a user requesting the document has the proper access privileges that can be granted by the access rules, the key will be retrieved to proceed with the decryption of the encrypted document.

To ensure that the security information or the header is not readily revealed, at least a portion of the header itself can be encrypted with a cipher. Depending on an exact implementation, the cipher for the header may or may not be identical to the one used for the document. The key (referred to as a user key) to decrypt the encrypted header can, for example, be stored in a local store of a terminal device and activated only when the user associated with it is authenticated. As a result, only an authorized user can access the secured document.

Optionally, the two portions (i.e., the header (possibly encrypted) and the encrypted document) can be encrypted again and only decrypted by a user key. In another option, the encrypted portions (either one or all) can be error-checked by an error-checking portion, such as using a cyclical redundancy check to ensure that no errors have been incurred to the encrypted portion(s) or the secured document.

Figure 2B:
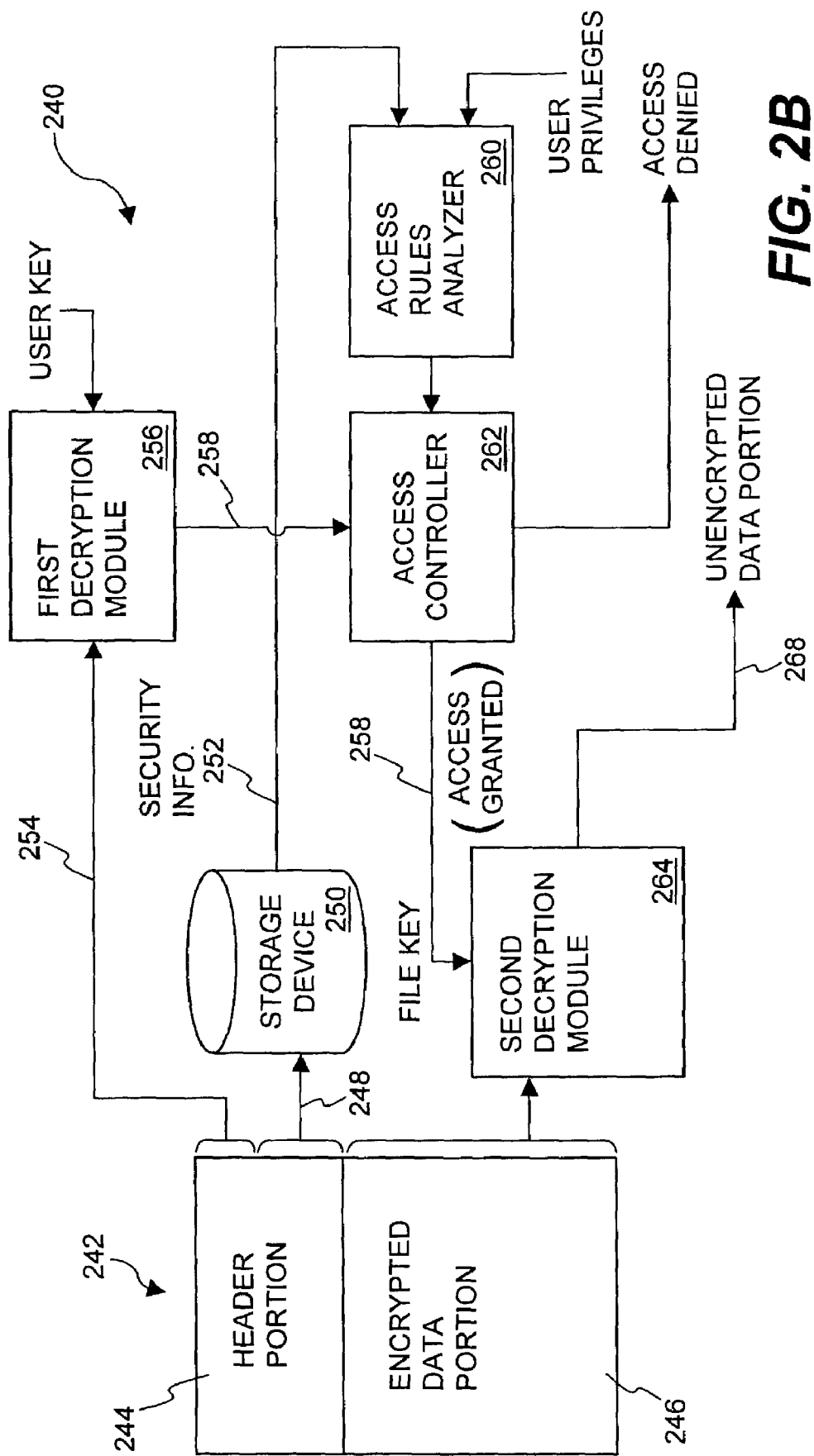
FIG. 2B is a block diagram of a secured item access system according to one embodiment of the invention.

FIG. 2B is a block diagram of a secured item access system 240 according to one embodiment of the invention. The secured item access system 240 operates to process a secured item 242 on behalf of a requestor to either permit or deny access to its contents. The secured item 242 is, for example, a secured file, such as a secured document.

The secured item 242 includes a header portion 244 and an encrypted data portion 246. The header portion 244 includes at least a pointer 248. When a requestor requests access to the secured item 242, the pointer 248 from the header portion 244 is supplied to a storage device 250. The pointer 248 is used to locate security information 252 stored in the storage device 250. In this embodiment, the security information 252 is not encrypted; however, in another embodiment, the security information 252 could be further secured by encryption. Hence, the pointer 248 is used to retrieve the security information 252 from the storage device 250.

The header portion 244 also includes at least an encrypted file key 254. The encrypted file key 254 is encrypted in this embodiment to secure the file key. Hence, the encrypted file key 254 is supplied to a first decryption module 256. The first decryption module 256 also receives a user key. In one embodiment, the user key is a private key, and in another embodiment, the user key is a public key. In any case, the first decryption module 256 operates to decrypt the encrypted file key 254 using the user key and thus produces an unencrypted file key 258.

The security information 252 typically includes at least access rules for access to the encrypted data portion 246 of the secured item 242. The security information 252 is supplied to an access rules analyzer 260. The access rules analyzer 260 also receives user privileges associated with the requestor. The access rules analyzer 260 examines the user privileges and the security information 252, namely, the access rules contained therein, to determine whether the requestor has sufficient privileges to gain access to the encrypted data portion 246 of the secured item 242. The access rules analyzer 260 outputs an access decision to an access controller 262. The access controller 262 receives the access decision and the file key 258. When the access controller 262 determines that the access decision does not permit the requestor to gain access to the encrypted data portion 246 of the secured item 242, then access to the encrypted data portion 246 for the secured item 242 is denied. Alternatively, when the access controller 262 determines that the access decision does permit the requestor to gain access to the encrypted data portion 246 of the secured item 242, then the file key 258 is supplied to a second decryption module 262. In addition, the encrypted data portion 246 of the secured item 242 (i.e., the data of the secured item 242) is supplied to the second decryption module 264. The second decryption module 264 then operates to decrypt the encrypted data portion 246 using the file key 258 to produce an unencrypted data portion 266. The unencrypted data portion 266 is then made available to the requestor, thereby permitting the requestor to gain access to the data associated with the secured item 242.

According to the invention, the header portion of a secured item is able to be reduced in size due to the use of a pointer. More particularly, the pointer in the header portion points to separately stored security information. Since the size of the pointer is substantially smaller than the size of the security information pointed to, the overall size of the secured item is reduced. In one embodiment, the pointer is structured in a fixed number of bits so that the size of the pointer is constant.

Additionally, with security information being separately stored, the security information is able to be shared across different documents, thus reducing the storage burdens for storage of secured items. Changes or modifications to security rules or other security information can be more easily made because changes to the secured items themselves are not necessary. That is, changes to security information stored to a storage device are performed without alterations to the corresponding secured items.

With respect to manageability of secured items, one feature of the invention is that through use of pointers to security information (stored at a storage device separately from the secured files) different secured files are able to share the same stored security information or parts thereof. For example, multiple secured files can utilize identical pointers such that they all share the same security information stored on a local storage device. Consequently, managing the security provided to the secured files is at least in part dependent upon the security information. Hence, by being able to share common security information, not only can the amount of security information storage space being utilized be substantially reduced, but also access to the associated secured files can be managed more efficiently.

Figure 2C:
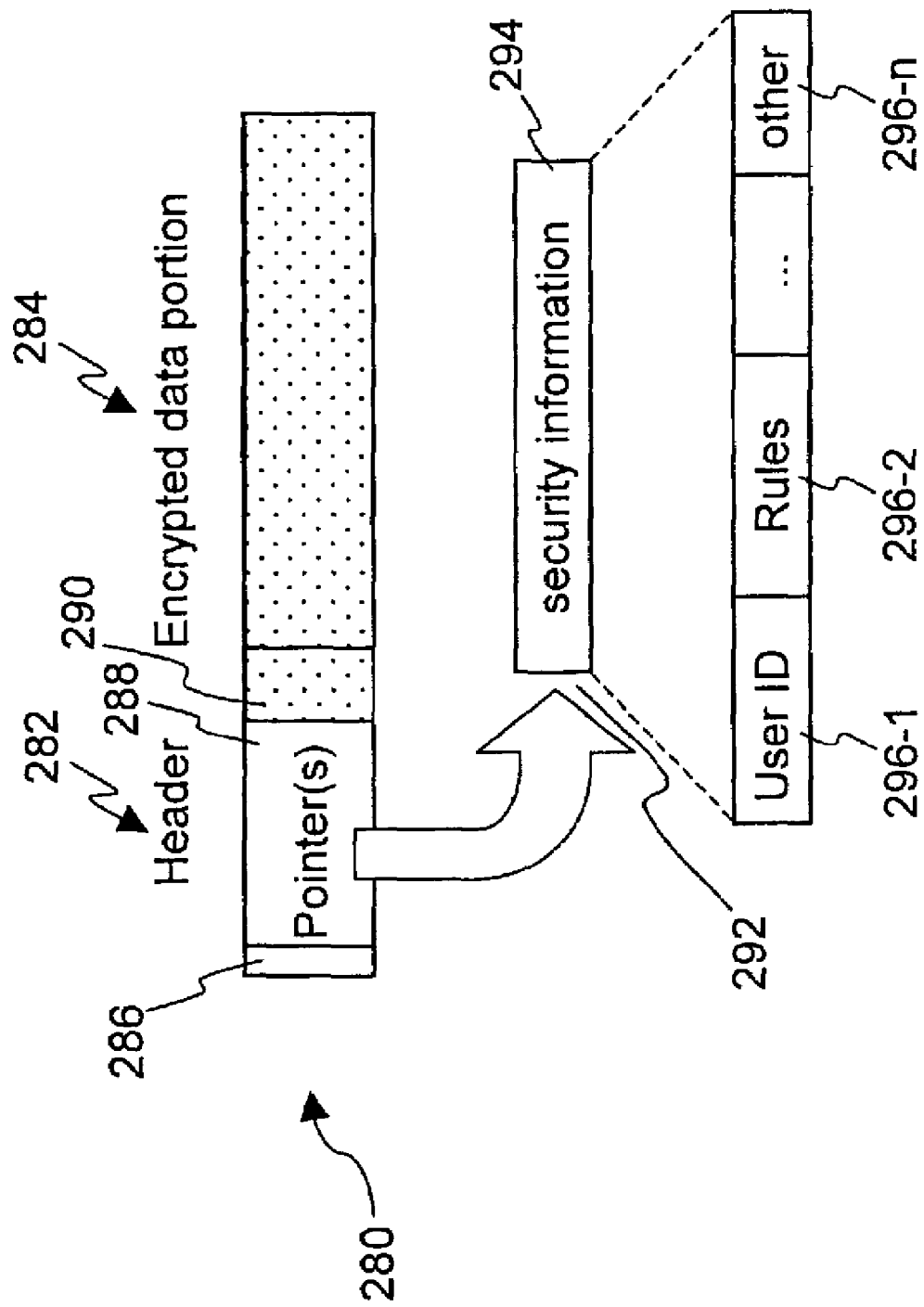
FIG. 2C is a diagram of a representative data structure for a secured file.

FIG. 2C is a diagram of a representative data structure 280 for a secured file. For example, the secured file can be the secured item 242 illustrated in FIG. 2B. The data structure 280 includes a header (or header portion) 282 and an encrypted data portion 284. The header 282 includes a flag bit 286, at least one pointer 288, and an encrypted file key 290. The flag bit 286 indicates whether or not the data structure pertains to a file that is secured. The at least one pointer 288 points to a remote data structure 292 stored in a storage device. The storage device is typically a local storage device. In other words, the data structure 280 and the remote data structure 292 are typically stored on a common machine (e.g., desktop or portable computer). The data structure 292 stores security information 294. The data structure 292 storing the security information 294 can vary depending upon implementation. However, as shown in FIG. 2C, the data structure 292 for the security information 294 includes a user identifier (ID) 296-1, rules (access rules) 296-2 and other 296-3. The other 296-3 is additional space for other information to be stored within the security information 294. For example, the other information 296-3 may be used to include other information facilitating secure access to the secured file, such as version number or author identifier. The encrypted file key 290 is normally itself decrypted and then used to decrypt the encrypted data portion 214 so as to access the content or data of the secured file.

Figure 3:
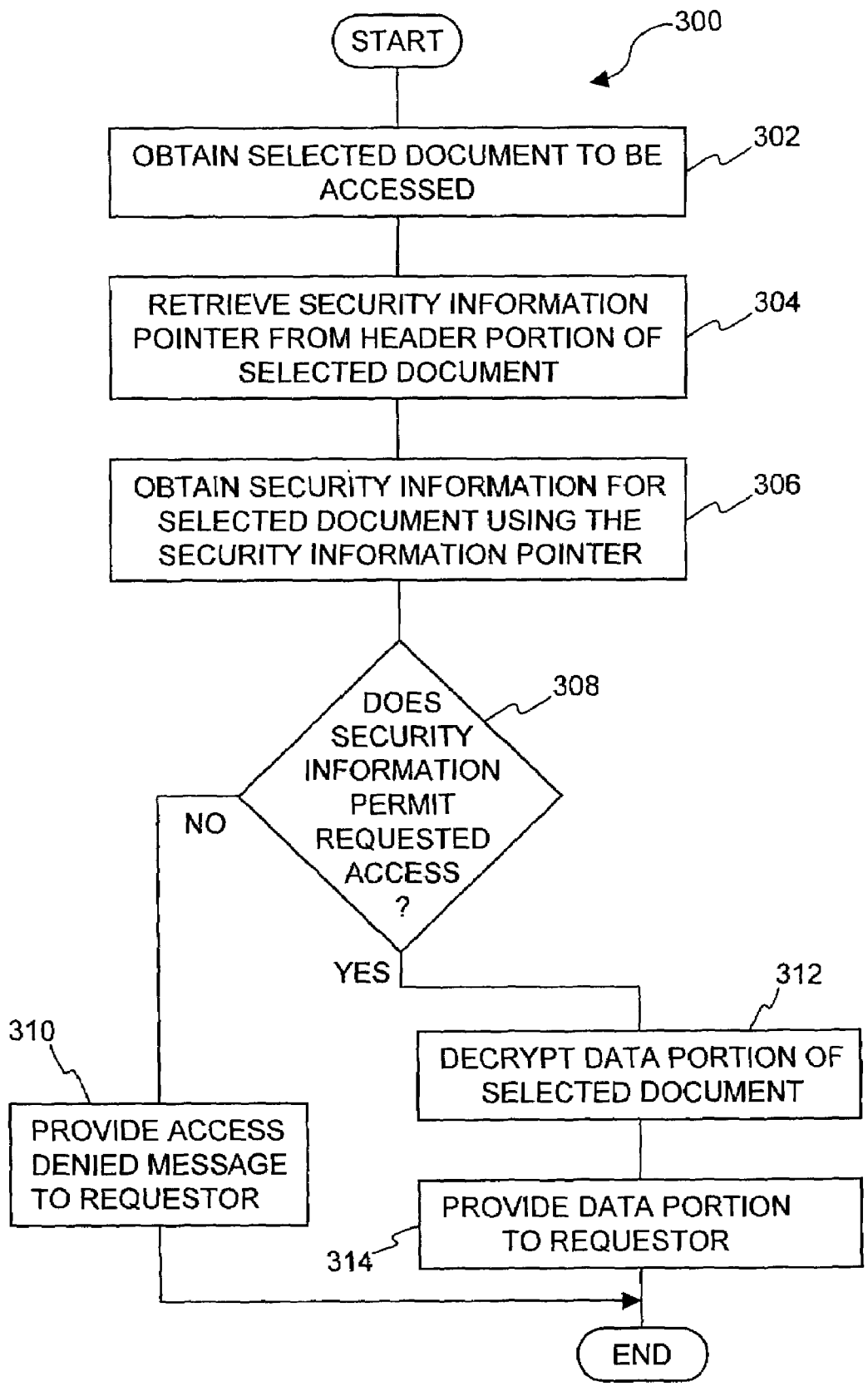
FIG. 3 is a flow diagram of secured document access processing according to one embodiment of the invention.

FIG. 3 is a flow diagram of secured document access processing 300 according to one embodiment of the invention. The secured document access processing 300 is typically performed by a computer. The computer can be a local computer or a remote computer. Further, the computer can also be considered both a local and a remote computer that operate in a client-server fashion.

The secured document access processing 300 can be invoked when a requestor selects a document to be accessed. The document is a particular type of file (for example, design.doc). Therefore, more generally, the requestor selects a file in a folder or among other files to be accessed. Once the document has been selected, the secured document access processing 300 is invoked. Initially, the selected document to be accessed is obtained 302. Typically, the selected document will have a header portion and a data portion. Next, a security information pointer is retrieved 304 from the header portion of the selected document. Here, the header portion of the selected document includes at least the security information pointer that points to an address location where the corresponding security information is located. Next, the security information for the selected document is obtained 306 using the security information pointer.

A decision 308 then determines whether the security information permits the requested access. In this regard, the security information may or may not be encrypted so that it remains secure while stored on the local storage. If the security information is encrypted, the security information would be decrypted (e.g., through use of a user key) to gain access to the security information. The security information contains, among other things, access rules. These access rules are used by the decision 308 in determining whether the requested access is permitted. Namely, the access rules are compared to privileges associated with the requestor for the selected document. When the decision 308 determines that the security information (namely the access rules) does not permit the requested access, then an access denied message is provided 310 to the requestor. On the other hand, when the decision 308 determines that the security information does permit the requested access, then the data portion of the selected document is decrypted 312. Typically, the header portion also includes a file key. The file key is itself normally encrypted and can be decrypted with a user key. The file key can be used to decrypt the encrypted data portion of the selected document. Once the data portion has been decrypted, the data portion is provided 314 to the requestor. Here, the requestor has gained access to the selected document. Following the operation 314, as well as following the operation 310, the secured access document processing 300 is complete and ends.

The security information is stored to a storage device and located through use of a pointer that is provided with a header portion of a secured file (document). The manner in which the security information is stored within the storage device can vary depending upon implementation. In one embodiment, the pointer directly points to a storage location (i.e., memory location) within the storage device. Stored at the storage location designated by the pointer is the security information. As an example, the security information 294 pointed to by the pointer 288 shown in FIG. 2C can be located in this manner.

In another embodiment, the security information can be stored in a database-type organization. FIG. 4A illustrates a data organization 400 according to one embodiment of the invention. According to the data organization 400, the association between a secured file 402 and its associated security information as separately stored in a storage device is illustrated. The secured file 402 includes a header portion 404 and a data portion 406. The header portion 404 includes at least a pointer 408 that points to a security information table 410. The security information table 410 can then, in turn, include a pointer to a rules table 412 that can store access rules. In general, the security information table 410 is encrypted by one or more keys in a key table 414. The tables 410, 412 and 414 of the data organization 400 can be provided within a database.

Figure 4B:
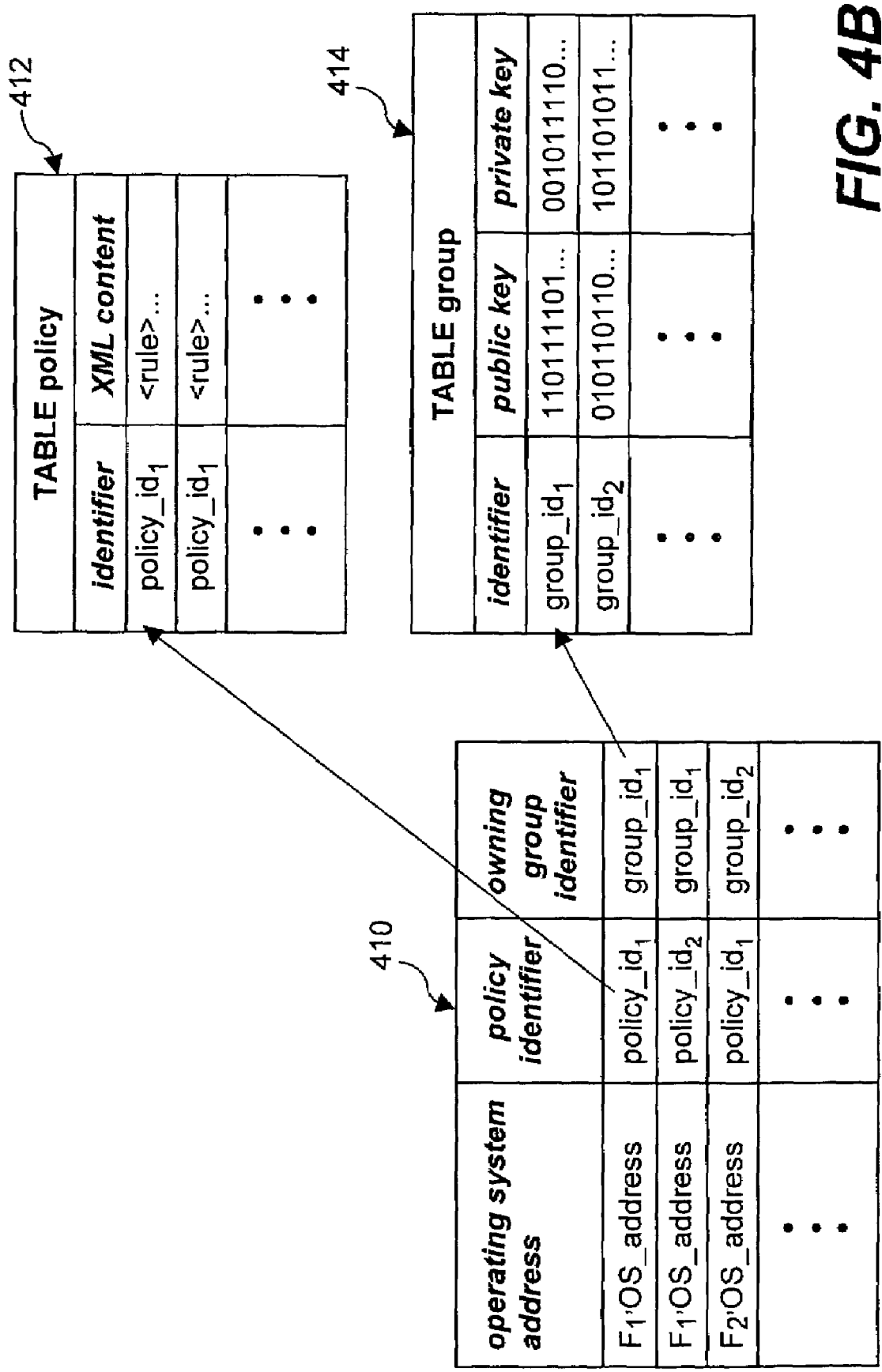
FIG. 4B illustrates exemplary tables for use with the data organization illustrated in FIG. 4A.

FIG. 4B illustrates exemplary tables for the security information table 410, the rules table 412, and the key table 414 illustrated in FIG. 4A. The security information table 410 is a main table that is addressed through use of a memory address maintained by an operating system. The pointer 408 points to one of the rows, namely, memory addresses (e.g., operating system addresses), of the security information table 410. The rows of the security information table 410 in turn can point to other tables or include data therein. As shown in FIG. 4B, the columns of the security information table 410 include an operating system address, a policy identifier column and an owning group identifier column. The operating system address column can serve as an index to the security information table 410. The policy identifier column of the security information table 410 includes pointers to particular rows in the rule table 412. The rules within the rules table 412 can be provided within a variety of different formats. The rules table 412 shown in FIG. 4B provides the rules expressed in a markup language format (such as eXtensible Markup Language (XML)). The owning group identifier column of the security information table 410 includes pointers pertaining to group identifiers. These pointers pertaining to the group identifiers point to rows within the key table 414. As shown in FIG. 4B, each row within the key table 414 can store a public key and a private key. In other words, each of the group identifiers is associated with a pair of public and private keys. Depending on implementation and a specific stage of a secured file being accessed, one or both of the public and private keys may be encrypted or readily used to encrypt or decrypt the security information table 410. In any case, only an authenticated user (in a user group identified by one of the group identifiers) can retrieve one of the keys to access the secured file 402.

Figure 5:
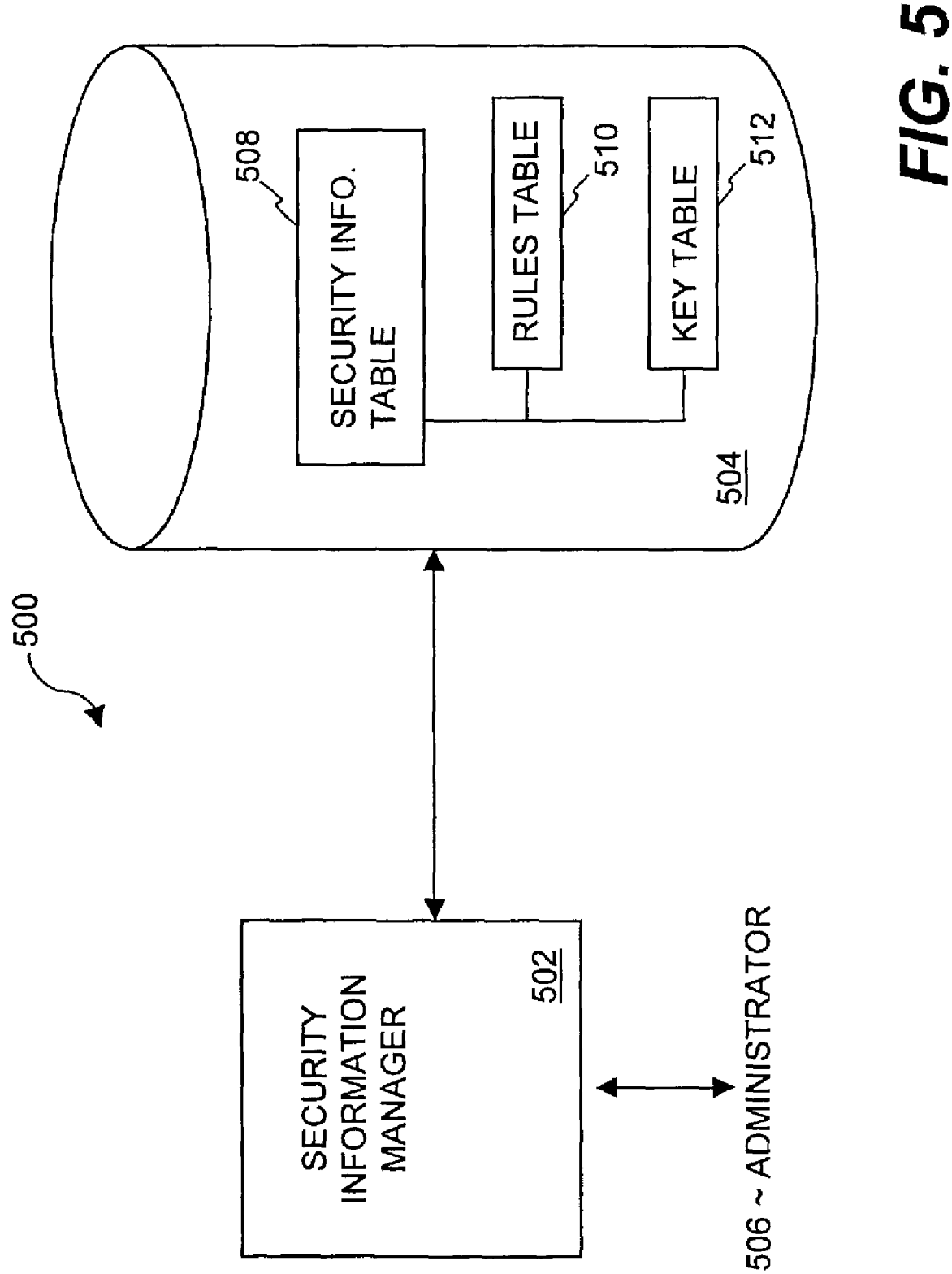
FIG. 5 is a block diagram of a file security management system according to one embodiment of the invention.

FIG. 5 is a block diagram of a file security management system 500 according to one embodiment of the invention. The file security management system 500 includes a security information manager 502 and a database 504. An administrator 506 interacts with the security information manager 502 typically through a graphical user interface (GUI). In this manner, the administrator 506 is able to store, modify or delete information in the database 504. By altering the security information stored in the database 504, the administrator is able to manage the nature of the security provided to associated files or documents. The database 504 includes the security information arranged in a plurality of tables. The tables include a security information table 508, a rules table 510 and a key table 512. For example, using the security information manager 502, the administrator 506 can provide new keys for the key table 512, such as to rotate keys for security reasons. As another example, the administrator 506 might interact with the security information manager to store new access rules (or policies) to the rules table 510. Hence, the separate and distributed storage of the security information and the user of pointers provides an efficient data arrangement that allows security information to be efficiently stored, modified and shared.

In general, a secured item (e.g., secured file) with its pointer to separately stored security information are stored relative to one another. Hence, moving the location of the secured item requires adjustment to the pointers, particularly when the movement is to another storage device. In other words, although stored in an efficient and manageable format, the secured item and its security information are not readily portable relative to one another as an association to the security information must be maintained. Processing discussed below is able to provide temporary portability for the movement of the secured item.

Figure 6A:
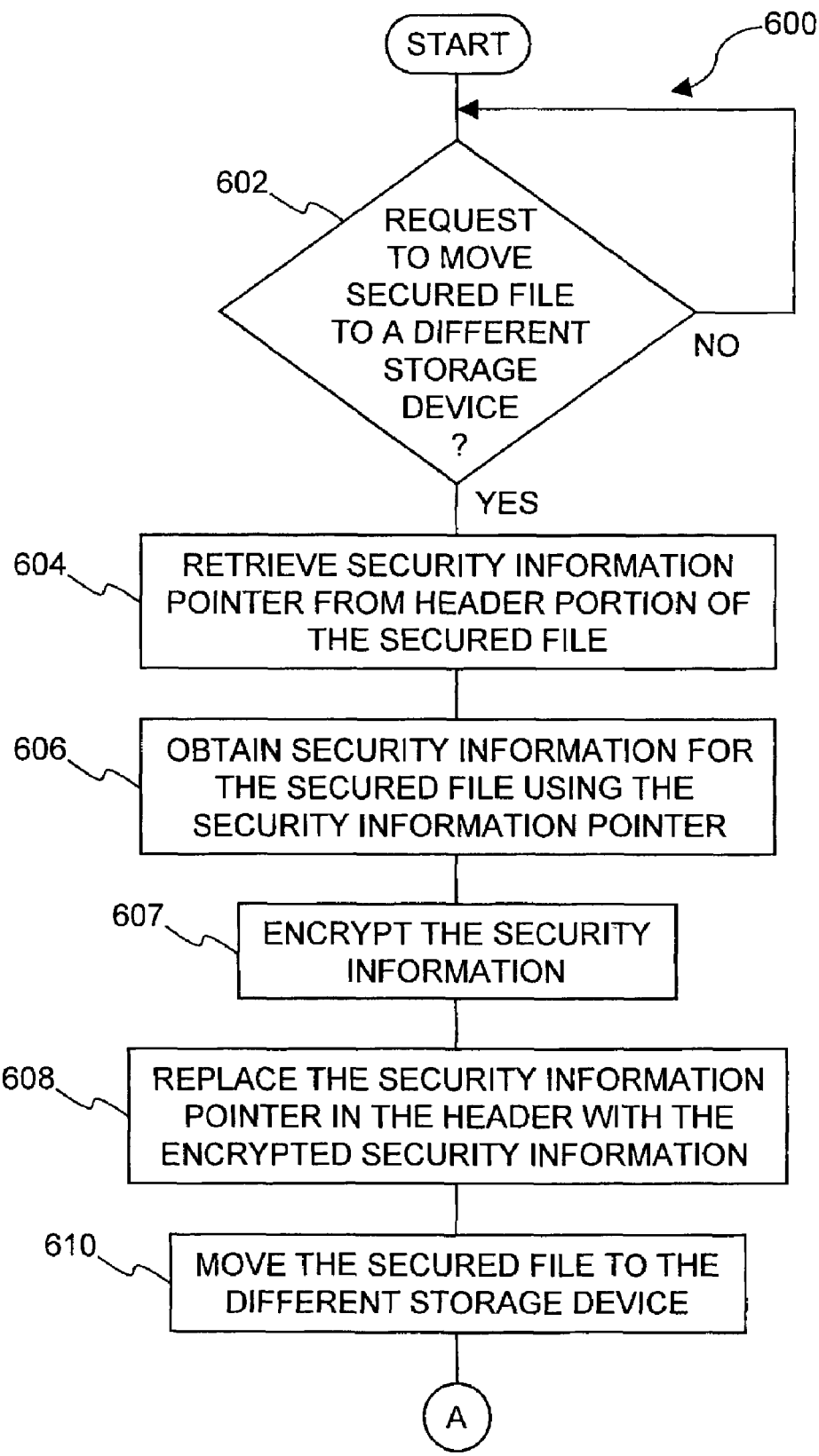
FIGS. 6A and 6B are flow diagrams of secured file portability processing according to one embodiment of the invention.
Figure 6B:
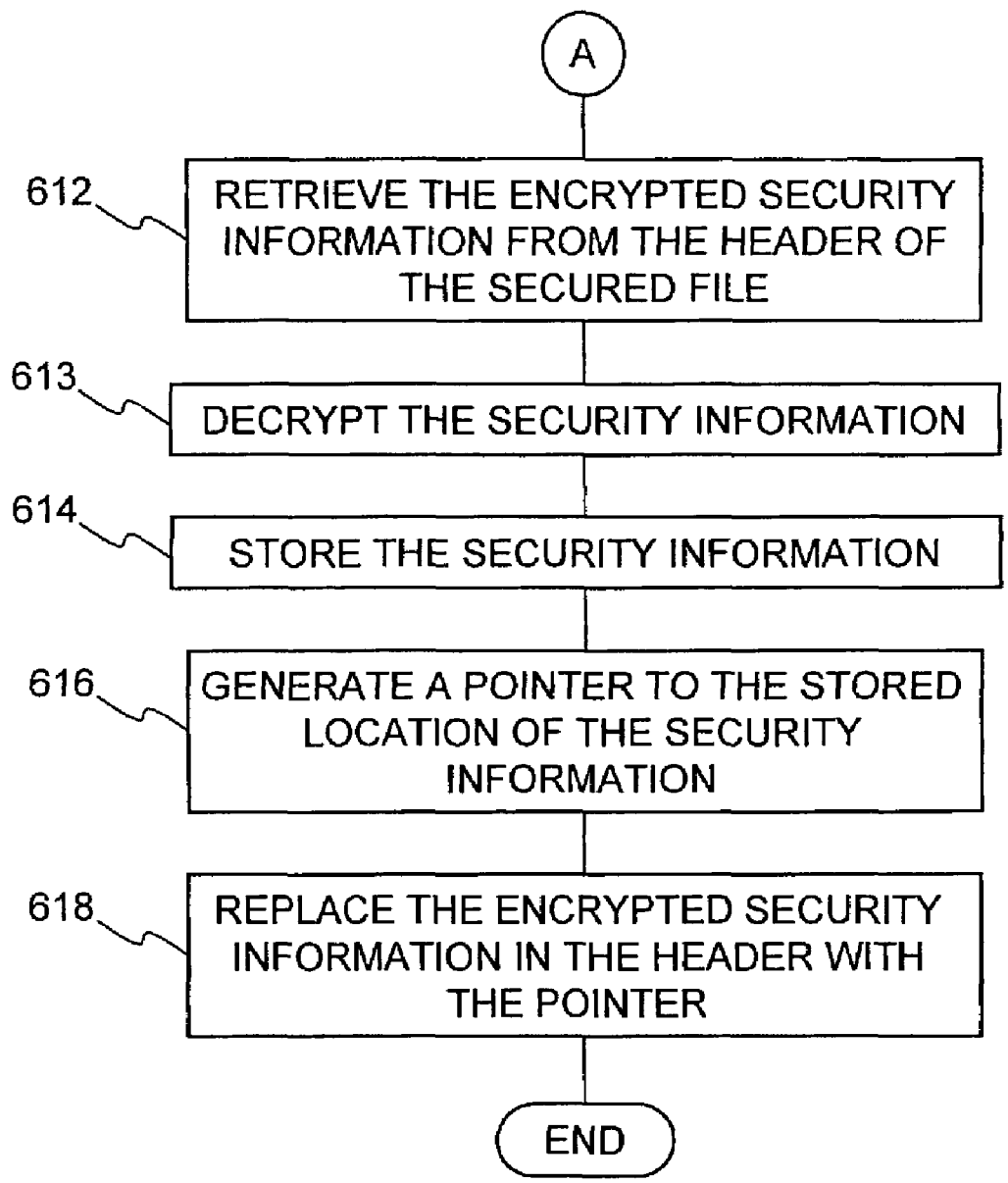

FIGS. 6A and 6B are flow diagrams of secured file portability processing 600 according to one embodiment of the invention. The secured file portability processing 600 pertains to processing carried out on a secured file when such file is being moved from its present storage device to a different storage device. Typically, these different storage devices are associated with different computers. The processing shown in FIG. 6A is typically performed by the computer initially storing the secured file, and the processing shown in FIG. 6B is typically performed by a different computer.

The secured file portability processing 600 begins with a decision 602 that determines whether a request to move a secured file to a different storage device has been received. When the decision 602 determines that such a request has not yet been received, the secured file portability processing 600 awaits such a request. Once the decision 602 determines that a request to move a secured file to a different storage device has been received, the secured file portability processing 600 begins its processing. Initially, a security information pointer is retrieved 604 from a header portion of the secured file. Security information for the secured file is then obtained 606 using the security information pointer. Typically, the security information is not encrypted at this point. Hence, the security information is encrypted. The security information can be encrypted using a key (e.g., public key). Next, the security information pointer in the header is replaced 608 with the encrypted security information.

After the security information pointer has been replaced with the encrypted security information, the secured file is portable and can thus be moved 610 to the different storage device. Once moved, the secured file can be stored to the different storage device in its portable format or additional processing as provided in FIG. 6B can be performed to store the secured file in a more efficient and manageable format.

When such additional processing is performed, the encrypted security information is initially retrieved 612 from the header of the secured file. The encrypted security information is then decrypted 613. Once decrypted 613, the security information is stored 614 to the different storage device. The different machine that is performing the processing shown in FIG. 6B has the security information stored therein. Next, a pointer to the stored location of the security information is generated 616. Thereafter, the encrypted security information in the header is replaced 618 with the pointer. At this point, the secured file has been altered such that it includes the pointer and not the encrypted security information. Consequently, the secured file is now more efficiently stored and more manageable. Following the operation 618, the secured file portability processing 600 is complete and ends.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape and optical data storage devices. Another example of the computer readable medium is carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that access rules or criteria are able to be stored separate from the corresponding secured items. Another advantage of the invention is that security information to be used with secured items is able to be readily altered by a security administrator. Still another advantage of the invention is that centralized, dynamic security management is facilitated. Yet another advantage of the invention is that the security approaches of the invention are useful for not only files but also non-file resources, even non-encryptable resources such as pipes/streams, ports and devices.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A computer readable storage medium having stored thereon computer program code, that if executed by a processor, causes the processor to access a secured item among a plurality of secured items by a method, the method comprising:

obtaining the secured item to be accessed, the secured item having a header portion and a data portion;

retrieving a security information pointer from the header portion of the secured item, wherein each of the plurality of secured items has the same security information pointer as the secured item, such that the plurality of secured items share common security information, wherein the security information includes at least an access rule and user privileges;

obtaining security information for the secured item using the security information pointer; and permitting access to the secured item to the extent permitted by the security information, wherein the permitting comprises:

retrieving a file key from the header portion;

decrypting the data portion of the secured item using the file key;

retrieving at least one access rule from the security information; and determining whether a requestor is permitted to access the secured item based on the at least one access rule and characteristics of the requestor.

2. The computer readable storage medium as recited in claim 1, wherein the requestor characteristics include at least a group association for the requestor.

3. The computer readable storage medium as recited in claim 1, wherein the at least one access rule is provided in a markup language format.

4. The computer readable storage medium as recited in claim 1, wherein a requestor desires to access the secured item, and wherein the method further comprises:

decrypting the security information after being obtained and before being used to determine whether access is permitted.

5. The computer readable storage medium as recited in claim 4, wherein the decrypting of the security information uses a key associated with the requestor.

6. The computer readable storage medium as recited in claim 5, wherein the key associated with the requestor is a user key.

7. The computer readable storage medium as recited in claim 1, wherein the security information includes at least access rules, and the header portion includes at least the security information pointer and the file key.

8. The computer readable storage medium as recited in claim 7, wherein when the permitting determines that the requestor is permitted to access the secured item, the permitting further comprises:

retrieving the file key from the header portion; and decrypting the data portion of the secured item using the file key.

9. The computer readable storage medium as recited in claim 8, wherein the file key is an encrypted file key.

10. The computer readable storage medium as recited in claim 9, wherein a requestor desires to access the secured item, and wherein the decrypting of the encrypted file key is performed using a key associated with the requestor.

11. The computer readable storage medium as recited in claim 1, wherein the secured item is a secured file.

12. The computer readable storage medium as recited in claim 1, wherein the secured item is a secured document.

13. The computer readable storage medium as recited in claim 1, the method further comprising:

changing the security information associated with the security information pointers without having to change each of the plurality of secured items individually.

14. The computer readable storage medium as recited in claim 1, wherein the security information pointers point directly to a storage location of the security information.

15. The computer readable storage medium as recited in claim 1, wherein the security information pointers point to a security information table associated with the security information.

16. The computer readable storage medium as recited in claim 1, wherein the security information pointers point to different versions of the security information providing different levels of access control depending on a user's access privilege.

17. A system for accessing a secured item among a plurality of secured items, the secured item having a header portion and an encrypted data portion, the header portion including a security information pointer and a file key, wherein each of the plurality of secured items has the same security information pointer as the secured item, such that the plurality of secured items share common security information, the system comprising:
a storage device configured to store the security information for the plurality of secured items, wherein the security information includes at least an access rule and user privileges;
a first decryption module configured to:
receive the security information pointer from the header portion of the secured item;
receive the file key from the header portion of the secured item; and
receive at least one access rule from the security information;
an access analyzer operatively connected coupled to the storage device, the access analyzer configured to determine whether the encrypted data portion is permitted to be accessed by a requestor based on the security information, wherein the access analyzer determines whether the encrypted data portion is permitted to be accessed by the requestor based on the at least one access rule and characteristics of the requestor; and
a second decryption module coupled to the access analyzer, the second decryption module configured to decrypt the encrypted data portion using the file key to produce an unencrypted data portion that the requestor is able to access, provided the access analyzer determines that the encrypted data portion is permitted to be accessed by the requestor.

18. The system as recited in claim 17, wherein the requestor has user privileges associated therewith, and wherein the access analyzer determines whether the encrypted data portion is permitted to be accessed by the requestor based on applying the access rule and the user privileges to the requestor and the secured item.

19. The system as recited in claim 17, further comprising:
a security management system configured to change the security information associated with the pointers without having to change each of the plurality of secured items individually.

20. The system as recited in claim 17, wherein the pointers point directly to the storage device.

21. The system as recited in claim 17, wherein the pointers point to a security information table associated with the security information in the storage device.

22. The system as recited in claim 17, wherein the pointers point to different versions of the security information providing different levels of access control depending on a user's access privilege.

23. A method for accessing a secured file stored in a storage device, comprising:
obtaining the secured file to be accessed, the secured file having a header portion and a data portion, wherein the storage device is configured to store security information for a plurality of secured items, wherein the security information includes at least access rules;
retrieving a security information pointer from the header portion of the secured file, wherein the plurality of secured items have the same security information pointer as the secured file, such that the plurality of secured items share the security information;
obtaining, from the storage device, security information for the secured file using the security information pointer; and
permitting access to the secured file to the extent permitted by the security information, wherein the permitting comprises:
retrieving a file key from the header portion;
decrypting the data portion of the secured file using the file key;
retrieving at least one access rule from the security information; and
determining whether a requestor is permitted to access the secured file based on the at least one access rule and requestor characteristics.

24. The method of claim 23, wherein the requester characteristics include at least a group association for the requester.

25. The method of claim 23, wherein the at least one access rule is provided in a markup language format.

26. The method of claim 23, wherein after obtaining security information for the secured file from the storage device, but before the permitting, the method further comprises:
decrypting the security information.

27. The method of claim 26, wherein decrypting the security information is performed using a key associated with the requestor.

28. The method of claim 27, wherein the key associated with the requester is a user key.

29. The method claim 23, wherein the header portion includes at least the security information pointer and the file key.

30. The method of claim 29, wherein when access to the secured file is permitted by the requestor, the permitting further comprises:
retrieving the file key from the header portion; and
decrypting the data portion of the secured file using the file key.

31. The method of claim 30, wherein the file key is an encrypted file key.

32. The method of claim 31, wherein decrypting the data portion of the secured file using the file key is performed using a key associated with a requester requesting access to the secured file.

* * * * *